United States Patent
Chini et al.

(10) Patent No.: US 10,381,657 B2
(45) Date of Patent: Aug. 13, 2019

(54) BIPOLAR PLATE

(71) Applicant: Röchling Automotive SE & Co. KG, Mannheim (DE)

(72) Inventors: Fabrizio Chini, Isera (IT); Edoardo Martelli, Appiano sulla strada del vino (IT); Manfred Kampke, Eitensheim (DE)

(73) Assignee: Röchling Automotive SE & Co. KG, Mannheim (DE)

( * ) Notice: Subject to any disclaimer, the term of this patent is extended or adjusted under 35 U.S.C. 154(b) by 563 days.

(21) Appl. No.: 15/042,792

(22) Filed: Feb. 12, 2016

(65) Prior Publication Data

US 2016/0240867 A1  Aug. 18, 2016

(30) Foreign Application Priority Data

Feb. 17, 2015 (DE) ........................ 10 2015 202 821

(51) Int. Cl.
| | |
|---|---|
| H01M 8/0234 | (2016.01) |
| H01M 8/0236 | (2016.01) |
| H01M 8/0239 | (2016.01) |
| H01M 8/0243 | (2016.01) |
| B29C 70/88 | (2006.01) |
| H01M 8/0245 | (2016.01) |
| B29C 70/46 | (2006.01) |
| B29C 70/08 | (2006.01) |

(Continued)

(52) U.S. Cl.
CPC .......... *H01M 8/0243* (2013.01); *B29C 70/08* (2013.01); *B29C 70/465* (2013.01); *B29C 70/882* (2013.01); *H01M 8/0234* (2013.01); *H01M 8/0236* (2013.01); *H01M 8/0239* (2013.01); *H01M 8/0245* (2013.01); *B29K 2101/12* (2013.01); *B29K 2307/04* (2013.01); *B29K 2995/0005* (2013.01); *B29K 2995/0058* (2013.01); *B29L 2031/3468* (2013.01)

(58) Field of Classification Search
None
See application file for complete search history.

(56) References Cited

U.S. PATENT DOCUMENTS

| | | | |
|---|---|---|---|
| 4,579,789 A * | 4/1986 | Fukuda | H01M 8/0297 429/514 |
| 6,103,413 A | 8/2000 | Hinton et al. | |

(Continued)

FOREIGN PATENT DOCUMENTS

| | | |
|---|---|---|
| DE | 699 02 259 T2 | 3/2003 |
| DE | 697 16 483 T2 | 6/2003 |

(Continued)

OTHER PUBLICATIONS

Espacenet Bibliographic data: DE10219384, Published Nov. 20, 2003, 1 pg.

(Continued)

*Primary Examiner* — Haroon S. Sheikh
(74) *Attorney, Agent, or Firm* — Rankin, Hill & Clark LLP

(57) ABSTRACT

A bipolar plate for a fuel cell comprises a fiber reinforcement structure containing thermoplastically bonded carbon fibers, the fiber reinforcement structure being multilayered and comprising a plurality of fiber reinforcement structure layers, at least two of which contain thermoplastically bonded carbon fibers.

18 Claims, 2 Drawing Sheets

(51) Int. Cl.
     *B29L 31/34*     (2006.01)
     *B29K 307/04*    (2006.01)
     *B29K 101/12*    (2006.01)

(56) References Cited

U.S. PATENT DOCUMENTS

| | | |
|---|---|---|
| 6,500,585 B1 | 12/2002 | Saakes et al. |
| 2003/0219646 A1 | 11/2003 | LeCostaouec |
| 2004/0229993 A1 | 11/2004 | Huang et al. |
| 2008/0220282 A1 | 9/2008 | Jang et al. |

FOREIGN PATENT DOCUMENTS

| | | |
|---|---|---|
| DE | 102 19 384 A1 | 11/2003 |
| DE | 603 09 312 T2 | 5/2007 |
| WO | 03/094270 A2 | 11/2003 |

OTHER PUBLICATIONS

International Search Report for corresponding DE 10 2015 202 821.6 dated Sep. 29, 2015, 9 pgs.

\* cited by examiner

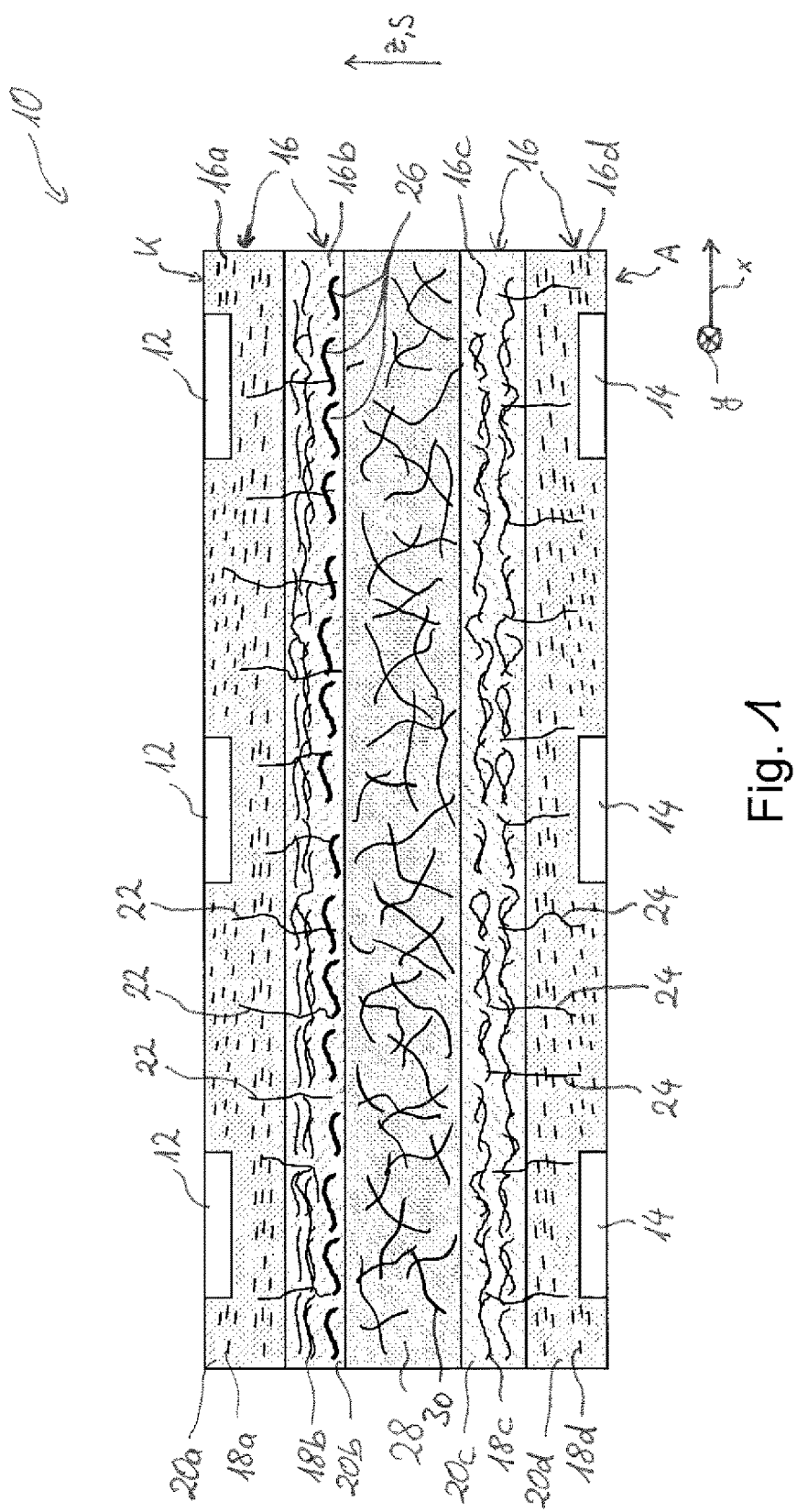

BIPOLAR PLATE

The present invention relates to a bipolar plate for a fuel cell, comprising a fiber reinforcement structure containing thermoplastically bonded carbon fibers.

BACKGROUND OF THE INVENTION

Such bipolar plates are generally used in fuel cell stacks. These are a plurality of fuel cells that are connected electrically in sequence and follow one another successively in a stack direction. The individual fuel cells are separated from each other by bipolar plates. A bipolar plate must be electrically conductive at least in areas over its entire extension in the direction of thickness and, since it is generally in contact with acidiferous electrolytes during operation, must also be acid-resistant.

Conventional bipolar plates have therefore been manufactured from sintered graphite, since graphite is both electrically conductive and acid-resistant. Bipolar plates made of sintered graphite are expensive to manufacture and difficult to handle, however, since sintered graphite is a very brittle material.

One advantageous alternative to this that is cost-effective and easy to handle is the bipolar plates defined at the outset. With a properly selected thermoplastic binder, they can have a high level of chemical resistance to acids. Due to the carbon fibers, they are highly electrically conductive. One such bipolar plate is known, for example, from printed publication DE 102 19 384 A1. In this bipolar plate, carbon fibers with a length of less than one millimeter are bonded in a thermoplastic plastic matrix. The carbon fibers are uniformly distributed in the plastic matrix, which leads to a given electrical conductivity.

However, due to the arrangement of the bipolar plate between two electrodes of different polarity, one of which belongs to another of two fuel cells arranged immediately adjacently in the stacking direction, it can be advantageous if the electrical characteristics of a bipolar plate can be set in a defined manner, for instance in order to enable the bipolar plates to be adapted to characteristics of the electrodes adjacent to them.

SUMMARY OF THE INVENTION

It is therefore an object of the present invention to provide a bipolar plate whose electrical characteristics can be set to a certain extent.

According to a first aspect of the present invention, this object is achieved by a bipolar plate of the type mentioned at the outset in which the fiber reinforcement structure is multilayered and comprises a plurality of fiber reinforcement structure layers, at least two of which contain thermoplastically bonded carbon fibers.

A bipolar plate according to the invention has all of the advantages of the bipolar plate known from the prior art. To wit, it can be manufactured in a cost-effective manner, has a high level of chemical resistance to acidiferous electrolytes and is easy to handle. Moreover, a location-independent electrical conductivity can also be provided according to the invention, for example through identical fiber reinforcement structure layers. Unlike the prior art, however, the possibility also exists with a bipolar plate according to the invention to set the electrical characteristics in a targeted manner through different fiber reinforcement structure layers.

A bipolar plate is typically a laminar structure. What "laminar" essentially means is that such structures extend in two mutually orthogonal spatial directions (main directions of extension) beyond substantially larger dimensions than in a third spatial direction that is orthogonal to the two main directions of extension. In such laminar structures, the main directions of extension have a plane of main extension, while the third spatial direction defines a direction of thickness.

In a bipolar plate according to the invention, the electrical characteristics are established by the characteristics of the thermoplastically bonded carbon fibers, and thus also by the alignment of the carbon fibers in the plastic matrix. In order to be able to provide a direction-independent electrical conductivity at least in a carbon fiber-containing fiber reinforcement structure layer, it is preferred if at least one fiber reinforcement structure layer contains carbon fibers in the form of a fiber tangle since, in a fiber tangle, the carbon fibers are arranged substantially randomly and therefore have no uniform main direction of extension. In order to enable the provision of direction-independent electrical conductivity in a large region of the bipolar plate, it is preferred if a plurality of fiber reinforcement structure layers contain carbon fibers in the form of a fiber tangle.

A further provision can be made here that the at least one carbon fiber is needled in the form of a fiber reinforcement structure layer containing fiber tangle. Through needling, the alignment of fibers of the fiber tangle of carbon fibers and thus also the electrical conductivity provided by the carbon fibers can be influenced. In order to make it possible to also influence the electrical conductivity between two fiber reinforcement structure layers, a provision can be made that several fiber reinforcement structure layers containing carbon fibers in the form of a fiber tangle are needle with one another.

Through needling, a fiber reinforcement structure can be produced that has carbon fibers that extend predominantly in the direction of thickness of the fiber reinforcement structure beyond more than one fiber reinforcement structure layer. These carbon fibers contribute, on the one hand, to the electrical conductivity in the direction of thickness and, on the other hand, can also make a certain contribution to the structural cohesion of two fiber reinforcement structure layers. In a bipolar plate constructed in this way, the electrical and/or mechanical characteristics of the bipolar plate can be changed without having to make changes to the actual material composition.

In order not to damage or destroy the fiber material fiber reinforcement structure layer during the manufacture of the bipolar plate, it is preferred if the thermoplastic plastic binder has a melting point that is lower than the melting point or an upper temperature limit of the thermal resistance of the fibers to be bonded. As a result, a temperature range can be selected during the manufacture of the bipolar plate in which only the thermoplastic plastic for bonding the fibers is melted or softened, but not the fibers to be bonded.

In a development of the invention, a provision can be made that at least one fiber reinforcement structure layer has fibers in the bipolar plate that are made of a material other than carbon. By virtue of the fibers that are different from carbon fibers, the strength and/or stiffness of the corresponding fiber reinforcement structure layer can be set independently of the electrical characteristics. Glass and/or mineral fibers can be suitable, for example, for this purpose.

As explained above, a bipolar plate points with two of its sides to different fuel cells in a fuel cell stack. Here, a laminar bipolar plate is preferably constituted by the sides with the largest surface area in order to enable the provision of large electrode surfaces and thus homogeneous electrical fields in the respective fuel cells. The exposed surfaces on these sides extend substantially parallel to the plane of main extension of the bipolar plate and therefore substantially orthogonal to the direction of thickness. It can be advantageous if the fiber reinforcement structure has different characteristics in the direction of thickness. Preferably, the fiber reinforcement structure has different fiber contents and/or thermoplastic binders and/or different fiber orientations and/or a different degree of needling and/or a different degree of compaction in the direction of thickness. As a result, both the electrical and the mechanical characteristics of the bipolar plate can be influenced in the direction of thickness. Precisely through the use of different degrees of compaction, it is also possible to set mechanical flow characteristics of the bipolar plate in a targeted manner.

In relation to the invention, these differences in the direction of thickness can be present in only one fiber reinforcement structure layer. It is preferred, however, if at least two fiber reinforcement structure layers differ with respect to their fiber composition and/or their fiber orientation and/or their layer thickness and/or their fiber content and/or their carbon fiber content and/or their degree of needling and/or their degree of compaction and/or if at least two fiber reinforcement structure layers are bonded with different thermoplastic plastics. Preferably, a core layer and a top layer differ with respect to these characteristics. A top layer is a fiber reinforcement structure layer that borders on only one other fiber reinforcement structure layer in the direction of thickness, whereas a core layer is held in the direction of thickness between two other fiber reinforcement structure layers and is arranged in the direction of thickness between the two top layers, preferably about in the middle between them.

In this embodiment, fiber reinforcement structure layers lying further to the outside can have a greater electrical conductivity and/or a greater carbon fiber proportion by weight than a fiber reinforcement structure layer of the fiber reinforcement structure lying further to the inside.

In addition, fiber reinforcement structure layers lying further to the outside in the direction of thickness can be bonded with a thermoplastic plastic having greater chemical resistance to acidiferous electrolytes than a thermoplastic plastic binder of a fiber reinforcement structure layer lying further to the inside in the direction of thickness, since they, unlike fiber reinforcement structure layers lying further to the outside, do not come into contact with acidiferous electrolytes, or only to a lesser extent.

In a development of the invention, a provision can be made that a fiber reinforcement structure layer has a greater mass proportion by weight of fibers made of a material other than carbon fibers. As a result, this fiber reinforcement structure layer can make a greater contribution to the strength and/or stiffness of the bipolar plate than if it were to contain only carbon fibers. Preferably, this fiber reinforcement structure layer is arranged between two other fiber reinforcement structure layers and is especially preferably a core layer of the fiber reinforcement structure, since, due to its high level of stiffness and/or strength, it can serve as a carrier for adjacent, less strong and/or stiff fiber reinforcement structure layers.

As was already pointed out above, the bipolar plate according to the invention can also be embodied in a targeted manner with respect to its mechanical flow characteristics. Bipolar plates arranged between two fuel cells that are adjacent in the stacking direction are also used as fluid lines for feeding reaction gas to the electrodes. In the prior art, fluid conduction channels are embodied for this purpose in bipolar plates on their outer surfaces pointing toward the electrodes. Such a design of fluid conduction channels in the bipolar plates can be omitted if the bipolar plate has a gas-impermeable separating region arranged next to a porous region in the direction of thickness.

Due to its gas-impermeability, the separating region can be used for reliable separation of the reaction gases fed to the differently poled electrodes on the two sides of the bipolar plate. Precisely due to its porosity, the at least one porous region enables gas to pass through, so that reaction gas can be conducted through the at least one porous region to an electrode of a fuel cell, or a waste gas resulting from a reaction can be conducted away from same.

Preferably, the separating region is arranged between two porous regions, so that different reaction gases and/or waste gases can be conducted on the two sides of the separating region without interfering with one another or mixing along the respective side of the separating region in the bipolar plate.

In order to enable targeted feeding of a reaction gas into the porous region of a bipolar plate and/or targeted discharging of a waste gas from the porous region of a bipolar plate, a provision can be made that the bipolar plate has a gas-impermeable edge region to at least one side of the separating region in the direction of thickness that encloses the porous region. The gas-impermeable edge region can be made of a different material than the separating region and be placed upon same. Preferably, however, the edge region is made of the same material as the separating region and even formed integrally therewith. A plate with an edge region projecting from the separating region on only one side can be used as an end plate at a longitudinal end of a fuel cell stack, for example.

On the other hand, for the usual arrangement of a bipolar plate between two electrodes, it is advantageous if it has a respective gas-impermeable edge region on either side of the separating region projecting therefrom in the direction of thickness. In connection with the edge region, "gas impermeable" does not mean that a gas-conducting through hole for feeding gas into the porous region or for discharging gas from same cannot or is not provided.

Preferably, separating region and edge region, as gas-impermeable regions, enclose the gas-conducting-porous region in the manner of a trough, the opening side facing toward the electrode contacted by the bipolar plate.

According to an advantageous structural embodiment of the invention, a provision can be made that the separating region is a region of the fiber reinforcement structure with a greater degree of compaction and/or that the at least one porous region is a region of the fiber reinforcement structure with a lesser degree of compaction. Then it is possible, in an advantageous manner, to make the bipolar plate of fiber starting materials that have compacted to different degrees, such as fiber tangles, particularly fibrous nonwovens, fiber mats, fiber rovings and the like.

Alternatively or in addition, the separating region can have a massive carbon-containing, particularly carbon fiber-containing plastic plate which, although it provides electrical conductivity due to its carbon content, particularly carbon fiber content, can be a very effective gas barrier due to its massive design. To facilitate the manufacture of a bipolar plate according to the invention, the separating region can preferably consist only of such a plastic plate. To facilitate of the connection of the separating region with the participation of the plastic plate to a porous fiber-containing region adjacent in the stacking direction or even to an edge region, the plastic plate can preferably comprise a thermoplastic plastic that is compatible with or identical to a thermoplastic plastic binder of an adjacent fiber reinforcement structure layer.

According to a preferred embodiment of the present invention, a provision can be made that a porous region is formed from a first fiber reinforcement structure layer and that the separating region is formed from a second fiber reinforcement structure layer. In the especially preferred case of a separating region arranged between two porous regions, each porous region is advantageously composed of at least one own fiber reinforcement structure layer and the separating region from another fiber reinforcement structure layer.

In order to set its mechanical flow characteristics—for example, in order to embody a section lying nearer to the outer surface provided for contact with an electrode with lower flow resistance than a region lying further away from this outer surface—the porous region can be formed from a plurality of fiber reinforcement structure layers which can differ with regard to their fiber density and/or their degree of compaction and/or their binder content.

Since the electrical characteristics of the bipolar plate are determined exclusively by the carbon fibers, at least one fiber reinforcement structure layer can be porous in order to provide a lightweight bipolar plate. Such a fiber reinforcement structure layer has the characteristic of expanding when heated (lofting), whereby an initially large-pored structure can be produced that can be compacted in a defined manner. This characteristic can thus be used in a compaction step following the lofting to set the porosity of this fiber reinforcement structure layer in a defined manner.

The direction of thickness of the bipolar plate is usually identical to the stacking direction of a fuel cell stack into which the bipolar plate is installed.

The technical object defined at the outset is achieved according to a second aspect of the present invention by a method for manufacturing a bipolar plate according to the invention, comprising the steps:
  a) provision of a multilayered fiber mixture comprising carbon fibers, preferably in the form of a fiber tangle, and thermoplastic binding fibers, at least two fiber mixture layers containing carbon fibers,
  b) heating of the fiber mixture above the melting point of the binding material and thus lofting of the material
  c) placement of the heated fiber mixture into a press mold,
  d) closing of the press mold,
  e) application of pressure to the fiber mixture,
  f) solidification of the binding material, and
  g) opening of the press mold and removal of the bipolar plate.

In the method according to the invention, through the provision of a multilayered fiber mixture with at least two carbon fiber-containing layers, the conductivity of a bipolar plate to be manufactured in this way can easily be set. Like in the prior art, it can be location-independent or location-dependent. A location-independent electrical conductivity can be achieved through the provision of substantially identical carbon fiber-containing fiber mixture layers, while location-dependence of the electrical conductivity can be achieved through different fiber mixture layers.

Unlike methods of manufacture based on injection molding, it is additionally possible with the manufacturing method according to the invention to provide a high carbon fiber content, since a low viscosity of the carbon fiber-plastic binder mixture resulting from this has almost no effect on the manufacturing method (pressing method with minimal flow paths).

Using the method according to the invention, at least one fiber reinforcement structure layer with a porous structure can be formed. Such a fiber reinforcement structure layer has the characteristic of expanding through heating (lofting), whereby an initially large-pored structure can be produced which can be compacted in a defined manner. The method according to the invention thus preferably has an additional step of the lofting of the at least one porous fiber reinforcement structure layer and a subsequent compaction step. In this way, a fiber reinforcement structure layer with a defined porosity can be provided.

Preferably, a first fiber reinforcement structure layer or a first arrangement of fiber reinforcement structure layers is compacted to gas-impermeability during the compaction step in order to form a separating region, preferably with edge region formed integrally with it. According to an advantageous development of the invention, a substantially flat, gas-impermeable, fiber-containing structure is produced in this compaction step having different thicknesses on its plane of main extension, the thickness at the edge of the structure for forming a gas-impermeable edge region being greater than in a central region of the flat fiber-containing structure.

Preferably, at least one fiber reinforcement structure layer with carbon fibers in the form of a fiber tangle is provided in this method. In this way, it can be ensured that they do not have any uniform main direction of extension and that they can thus provide for substantially direction-independent electrical conductivity.

In this context, a provision can also be made in the framework of the invention that at least one carbon fiber is needled in the form of a fiber mixture layer containing fiber tangle, whereby the number of carbon fibers in the direction of thickness in this fiber mixture layer can be increased compared to the same non-needled arrangement. The electrical conductivity in the direction of thickness can, in turn, be influenced via the carbon fibers running predominantly in the direction of thickness. Here, a provision can also be made that several fiber mixture layers containing carbon fibers in the form of a fiber tangle are needled with each other. Through this method step, the number of carbon fibers extending on the plane of main extension of a fiber reinforcement structure layer can particularly be reduced, and the number of carbon fibers of the bipolar plate extending predominantly in the direction of thickness can be increased to the same degree. The electrical conductivity can thus ultimately be influenced without changing the material composition of the layers.

To enable the provision of an especially stiff and strong bipolar plate, a provision can be made in a development of the invention that a massive carbon-containing, particularly carbon fiber-containing plastic plate is placed into the press mold between two carbon fiber-containing fiber mixture layers. Due to its massive and thus strong and stiff design, it can also act as a carrier for adjacent fiber reinforcement structure layers. In order to ensure an especially good level of adhesion to the adjacent fiber reinforcement structure layers, the plastic plate preferably comprises a thermoplastic plastic that is compatible with or identical to a thermoplastic plastic binder of an adjacent fiber reinforcement structure layer.

The present invention also relates to a use of a bipolar plate according to the invention in a fuel cell as well as to a fuel cell with a bipolar plate according to the invention.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein:

FIG. 1 shows a cross-sectional view of a first embodiment of a bipolar plate according to the invention.

DESCRIPTION OF PREFERRED EMBODIMENTS

Figure 2A:
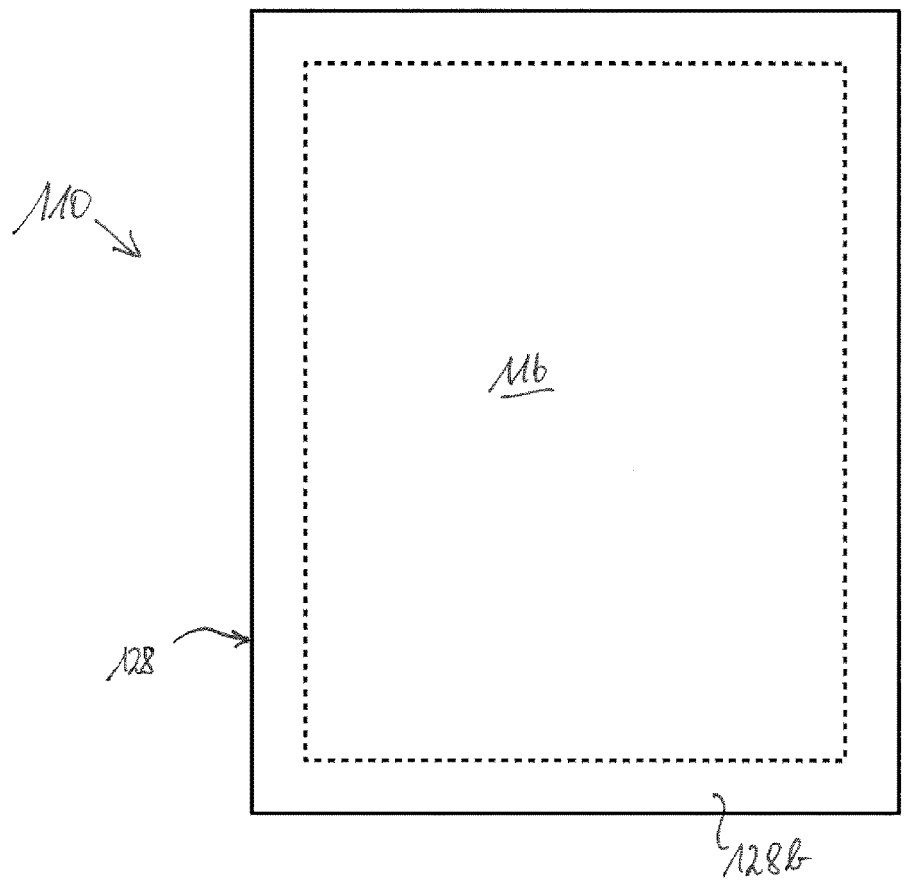
FIG. 2a shows a top view of a second embodiment of a bipolar plate according to the invention.

Referring now to the drawing wherein the showings are for the purpose of illustrating preferred and alternative embodiments of the invention only and not for the purpose of limiting the same, FIG. 1 shows a first embodiment of a bipolar plate according to the invention is provided very generally with reference symbol 10. Such a bipolar plate 10 can be used, for example, in a fuel cell stack. A fuel cell stack consists of a plurality of fuel cells connected electrically in series that are stacked on one another in a stacking direction S. The respective fuel cells are separated from each other by bipolar plates 10. In the figure, one contact side—for instance, the side facing toward a cathode of a first fuel cell (not shown)—is provided with reference symbol K, and the opposing contact side—for instance, the side facing toward an anode of a second fuel cell (not shown)—is provided with reference symbol A. As is shown in FIG. 1, a plurality of flow channels 12 and 14 can be provided on the side K and on the side A via which the reaction gases to be fed to the first and the second fuel cell, such as hydrogen or oxygen, for instance, and reaction products, such as water, to be discharged from same can be conducted.

The bipolar plate 10 shown in FIG. 1 comprises a fiber reinforcement structure 16 with several fiber reinforcement structure layers 16a, 16b, 16c, 16d bonded with thermoplastic plastic 20a, 20b, 20c, 20d, at least two of which contain carbon fibers bonded with thermoplastic plastic in the context of the invention. As will readily be understood, it is possible, as shown in the figure, for all fiber reinforcement structure layers 16a-d to contain thermoplastically bonded carbon fibers 18a, 18b, 18c, 18d.

The bipolar plate 10 illustrated in the figure is laminar, i.e., it extends in two mutually orthogonal main directions of extension x, y beyond substantially larger dimensions than in a third spatial direction z orthogonal to the two main directions x, y. The main directions of extension x, y span over plane of main extension, whereas the third spatial direction z defines a direction of thickness that usually corresponds with the stacking direction S. To facilitate the stacking of fuel cells, the bipolar plate 10 is preferably flat.

Through the sequence of the fiber reinforcement structure layers 16a-d in the direction of thickness z, the bipolar plate 10 can be provided with an exactly defined electrical conductivity, since the electrical conductivity is predetermined by the characteristics and number of the carbon fibers 18a-d in the respective fiber reinforcement structure layers 16a-d, and these characteristics can be set with precision.

The fiber reinforcement structure layers 16b, 16c can contain carbon fibers 18b, 18c in the form of a fiber tangle, such as a fibrous nonwoven. Here, the carbon fibers 18b, 18c have no uniform main direction of extension but rather are randomly aligned. The electrical conductivity made available by the carbon fibers 18b, 18c present as fiber tangle therefore also does not have any directional dependency in the fiber reinforcement structure layers 16b, 16c.

The provision of the carbon fibers 18b, 18c in the form of a fiber tangle also offers the advantage that the alignment thereof can easily be changed through needling, which has a direct effect on their electrical conductivity. Through needling, the number of carbon fibers 22, 24 that extend substantially in the direction of thickness z can be increased. As a result, the electrical conductivity in the direction of thickness z can be increased while it is simultaneously decreased on der plane of main extension of the respective fiber reinforcement structure layers 16b, 16c.

As is also shown in the figure, a fiber reinforcement structure layer 16b can have fibers 26 made of a material other than carbon, such as glass or mineral fibers, which has a higher melting point than a plastic bonding this fiber reinforcement structure layer 16b. In this way, it is ensured that these fibers 26 retain their fiber structure during the manufacture of the bipolar plate 10, for example by pressmolding. Through the addition of such fibers 26 not made of carbon, the mechanical characteristics of the fiber reinforcement structure layer 16b can be set substantially independently of their electrical characteristics. Although the figure only shows the fiber reinforcement structure layer 16b with fibers different from carbon, it is not the intention to rule out all fiber reinforcement structure layers 16a-d being provided with such fibers.

For operation in a fuel cell stack, it is preferred if the bipolar plate 10 has different characteristics in different regions. For instance, it can be advantageous if its top layers 16a, 16d have especially good chemical resistance to acidiferous electrolytes, whereas less acid resistance may be sufficient for other layers. For this reason, the fiber reinforcement structure layers 16a-d can have different structures. For example, they can differ with respect to fiber composition and/or fiber orientation and/or layer thickness and/or fiber content and/or carbon fiber content and/or fiber length and/or degree of needling and/or degree of compaction. It can also be advantageous if two fiber reinforcement structure layers are bonded with different thermoplastic plastics.

A thermoplastic plastic having greater chemical resistance to acidiferous electrolytes than a plastic of a fiber reinforcement structure layer 16b, 16c lying further to the inside in the direction of thickness z can then be used in a top layer 16a, 16d, since the fiber reinforcement structure layers 16b, 16c lying further to the inside in the direction of thickness z do not come into contact with an acidiferous electrolyte in a fuel cell or to a lesser extent than the top layers 16a, 16d.

Moreover, a fiber reinforcement structure layer 16a, 16d lying further to the outside in the direction of thickness z can have greater electrical conductivity than a fiber reinforcement structure layer 16b, 16c lying further to the inside in the direction of thickness z. This higher electrical conductivity can be achieved, for example, by a higher proportion of carbon fibers by mass.

Fiber reinforcement structure layers 16b, 16c lying further to the inside in the direction of thickness z can therefore be provided with a greater proportion by weight of fibers 26 made of a material other than carbon.

The core can also have a massive gas-impermeable plastic plate 28 interspersed with carbon fibers. This can act as a carrier for the fiber reinforcement structure layers 16a-d of the bipolar plate 10 and as a gas barrier for separating the different gases flowing into the flow channels 12 and 14 on the different sides K and A. Since the fiber reinforcement structure layers 16a to 16d can be porous, namely due to their fibrous structure, a mechanical flow separation of the channels 12 and 14, respectively, can sometimes not be ensured with the necessary reliability by these layers.

To enable the provision of especially good bonding to the adjacent fiber reinforcement structure layers 16b, 16c, the massive plastic plate 28 can comprise a thermoplastic plastic that is compatible with or identical to a thermoplastic plastic binder 20b, 20c of an adjacent fiber reinforcement structure layer 16b, 16c.

In order to ensure the electrical conductivity of the bipolar plate in the direction of thickness z, the plastic plate 28 can be embodied so as to be electrically conductive, for instance by filling it with an electrically conductive material such as carbon, for example. The plastic plate 28 preferably also contains carbon fibers 30.

Since the electrical characteristics of the bipolar plate 10 are determined exclusively by the carbon fibers 18a-d, the plastic matrix 20a-d plays no role here, i.e., it need not be compact. Therefore, at least one fiber reinforcement structure layer 16a-d can be bonded in a porous plastic matrix 20a-d, since weight can be reduced in this way compared to a massive plastic matrix.

Figure 2B:
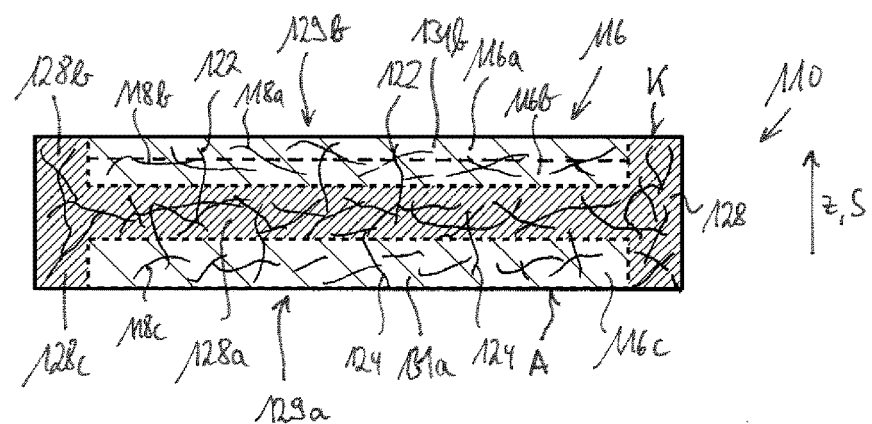
FIG. 2b shows a cross-sectional view of a second embodiment of a bipolar plate according to the invention.

FIGS. 2a and 2b show a top view and a cross-sectional view of a second embodiment of a bipolar plate according to the invention 110.

The second embodiment has the same reference symbols for same or functionally similar components and component segments as the first embodiment, but increased by the number 100. The second embodiment will be described in the following merely in terms as the differences from the first embodiment, to the description of which reference is otherwise expressly made for the explanation of the second embodiment.

Like that of the first embodiment, the bipolar plate 110 of the second embodiment has a massive plastic plate 128 as a separating region between the two outer side surfaces K and A, which can also be a fiber reinforcement structure layer 128 that is compacted until gas-impermeability is achieved. It acts as a gas barrier between the two outer side surfaces K and A.

The gas-impermeable compacted fiber reinforcement structure layer 128 has a central separating region 128a in the direction of thickness z from which likewise gas-permeable edge regions 128b and 128c project circumferentially on both sides at the edge of the bipolar plate 110. On both sides of the separating region 128a, the edge regions 128b and 128c as well as the separating region 128a each form a trough-shaped structure with a recess 129a and 129b comprised by the respective trough-shaped structure. The separating region 128a forms the respective bottom of the trough-shaped structures, and the edge regions 128b and 128c form the respective walls of the trough-shaped structures.

Porous regions 131a and 131b are formed by other fiber reinforcement structure layers in the recesses 129a and 129b. For example, the porous region 131a in the recess 129a can be formed from a single fiber reinforcement structure layer 116c, while the porous region 131b in the recess 129b can be formed from both fiber reinforcement structure layers 116a and 116b. It is possible, for example, for the fiber reinforcement structure layer 116a to have a greater porosity—due to a lower degree of compaction, for example—than the fiber reinforcement structure layer 116b lying at a greater distance from the outer surface K.

In the bipolar plate 110 of the second embodiment, the porous regions 131a and 131b formed from reinforcement structure layers serve to conduct gas, whether it be as a reaction gas or as a waste gas. The structure of the porous region 131b, which is two-layered for the sake of example, can have a lesser flow resistance due to the abovementioned differences in porosity of the individual layers 116a and 116b in the fiber reinforcement structure layer 116a than in the fiber reinforcement structure layer 116b and thus permit the conduction of a greater quantity of gas per unit of time with the same pressure gradient. This can be advantageous for the layer 116a lying nearer to an electrode.

For the sake of example, in the bipolar plate 110 of the second embodiment, all of the fiber reinforcement structure layers 116a to 116c were produced from a fiber mixture layer comprising a respective fiber tangle.

The example of the porous region 131a is merely intended to show that the porous region between separating region 128a and an electrode of a fuel cell can also be single-layered.

There are therefore no flow channels 12 embodied in the bipolar plate 110 since, in the bipolar plate 110 of the second embodiment, the respective gas is fed due to the existing porosity into the respective fiber reinforcement structure layers 116 themselves.

The separating region 128a and the edge regions 128b and 128c are preferably formed in a single piece from a single fiber reinforcement structure layer 128 through appropriate press-shaping during compaction.

A method for manufacturing the bipolar plate 10; 110 comprises the following steps:
 a) provision of a multilayered fiber mixture comprising carbon fibers 18a-d; 118a-c and binding fibers having a thermoplastic plastic 20a-d, at least two fiber mixture layers 16a-d; 116a-c with carbon fibers 18a-d; 118a-c being provided,
 b) heating of the fiber mixture above the melting point of the binding material and thus melting of the binding fibers,
 c) placement of the heated fiber mixture into a press mold,
 d) closing of the press mold,
 e) application of pressure to the fiber mixture,
 f) solidification of the binding material, and
 g) opening of the press mold and removal of the bipolar plate 10, 110.

In this method, it is particularly possible to influence the location-dependence of the electrical conductivity through the selection and arrangement of the carbon fiber-containing fiber mixture layers in the press mold.

Unlike manufacturing methods based on injection molding, higher fiber contents can additionally be achieved with this manufacturing method, since the viscosity of the carbon fiber-plastic mixture is not given any crucial importance here.

Preferably, at least one fiber mixture layer with carbon fibers 18b, 18c; 118a-c is provided in the form of a fiber tangle so that the carbon fibers 18b, 18c; 118a-c do not have any uniform direction and thus do not lead to direction-dependent electrical conductivity. In addition, the possibility exists in this context to alter the alignment of the carbon fibers 18b, 18c; 118a-c provided as a fiber tangle through needling without having to change the material composition of the fiber mixture.

If, as shown in FIG. 1, the bipolar plate 10 comprises a massive plastic plate 28, then the method can also comprise a step for the placement of the massive plastic plate 28 into the press mold.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A bipolar plate for a fuel cell, the bipolar plate comprising a fiber reinforcement structure including thermoplastically bonded carbon fibers, the fiber reinforcement structure being multilayered and comprising a plurality of fiber reinforcement structure layers, said fiber reinforcement structure layers having two top layers on the outside of the fiber reinforcement structure and an inner core layer arranged between said top layers, each of the top and the core layers having thermoplastically bonded carbon fibers, wherein a fiber reinforcement structure layer lying further to the outside has greater carbon fiber proportion by mass than a fiber reinforcement structure layer lying further to the inside of the fiber reinforcement structure.

2. The bipolar plate of claim 1, wherein at least one fiber reinforcement structure layer includes carbon fibers in the form of a fiber tangle.

3. The bipolar plate of claim 1, wherein a plurality of the fiber reinforcement structure layers includes carbon fibers in the form of a fiber tangle.

4. The bipolar plate as set forth in claim 2, wherein the at least one fiber reinforcement structure layer that includes carbon fibers in the form of a fiber tangle is needled.

5. The bipolar plate of claim 4, wherein the fiber reinforcement structure has carbon fibers that extend predominantly in the direction of a thickness of the fiber reinforcement structure beyond more than one fiber reinforcement structure layer.

6. The bipolar plate of claim 1, wherein at least one fiber reinforcement structure layer has fibers of a material other than carbon.

7. The bipolar plate of claim 6, wherein the material other than carbon includes at least one of glass and mineral fiber material.

8. The bipolar plate of claim 1, wherein the fiber reinforcement structure has at least one of different fiber contents, different thermoplastic binders, different fiber orientations, a different degree of needling, and a different degree of compaction in the direction of thickness.

9. The bipolar plate of claim 8, wherein at least two fiber reinforcement structure layers differ in at least one of fiber composition, fiber orientation, layer thickness, fiber content, fiber length, carbon fiber content, and degree of needling, at least two fiber reinforcement structure layers are bonded with the different thermoplastic binders.

10. The bipolar plate of claim 8, further including a gas-impermeable separating region next to a porous region in the direction of thickness.

11. The bipolar plate of claim 10, further including a gas-impermeable edge region projecting on at least one side of the separating region in the direction of the thickness that encloses the porous region.

12. The bipolar plate of claim 10, wherein at least one of the separating region is a region of the fiber reinforcement structure with a greater degree of compaction and the porous region is a region of the fiber reinforcement structure with a lesser degree of compaction.

13. The bipolar plate of claim 10, wherein the separating region has a carbon based plastic plate.

14. The bipolar plate of claim 13, wherein the plastic plate includes a thermoplastic material that is compatible with or identical to a thermoplastic binder of an adjacent fiber reinforcement structure layer.

15. The bipolar plate of claim 10, wherein the porous region is formed from a first fiber reinforcement structure layer and the separating region is formed from a second fiber reinforcement structure layer.

16. A bipolar plate for a fuel cell, the bipolar plate comprising a fiber reinforcement structure including thermoplastically bonded carbon fibers, the fiber reinforcement structure being multilayered and comprising a gas-impermeable separating region next to a porous region in the direction of thickness of the bipolar plate, said porous region comprising a first outer fiber reinforcement structure layer and a second inner fiber reinforcement structure layer, said second inner fiber reinforcement structure layer being arranged between the gas-impermeable separating region and the first outer fiber reinforcement structure layer in the direction of thickness of the bipolar plate, said first outer and second inner fiber reinforcement structures each having thermoplastically bonded carbon fibers, wherein the first outer fiber reinforcement structure layer has greater carbon fiber proportion by mass than the second inner fiber reinforcement structure layer.

17. A fuel cell comprising a bipolar plate of claim 16.

18. A fuel cell comprising a bipolar plate of claim 1.

* * * * *